United States Patent
Le Paih

(10) Patent No.: US 7,568,901 B2
(45) Date of Patent: *Aug. 4, 2009

(54) DEVICES FOR THE PRODUCTION OF MINCED MEAT STEAKS PROVIDED WITH A GARNISH

(75) Inventor: Jacques Le Paih, Plumeliau (FR)

(73) Assignee: Nijal (SA), Baud (FR)

( * ) Notice: Subject to any disclaimer, the term of this patent is extended or adjusted under 35 U.S.C. 154(b) by 695 days.

This patent is subject to a terminal disclaimer.

(21) Appl. No.: 10/516,261

(22) PCT Filed: May 26, 2003

(86) PCT No.: PCT/FR03/01578

§ 371 (c)(1),
(2), (4) Date: Nov. 29, 2004

(87) PCT Pub. No.: WO03/099021

PCT Pub. Date: Dec. 4, 2003

(65) Prior Publication Data

US 2005/0191402 A1    Sep. 1, 2005

(30) Foreign Application Priority Data

May 29, 2002  (FR) ................................. 02 06534

(51) Int. Cl.
*A22C 7/00*  (2006.01)

(52) U.S. Cl. ...................... 425/106; 99/450.7; 425/233; 425/235; 425/297; 425/327; 425/511; 425/514; 425/515

(58) Field of Classification Search ................. 425/106, 425/297, 327, 511, 514, 515, 233, 235; 99/450.7, 99/353, 537

See application file for complete search history.

(56) References Cited

U.S. PATENT DOCUMENTS

| | | | | |
|---|---|---|---|---|
| 3,354,842 A | | 11/1967 | Manspeaker | |
| 3,494,302 A | * | 2/1970 | Wolf et al. | 426/275 |
| 4,195,489 A | | 4/1980 | Bernard | |
| 4,678,418 A | * | 7/1987 | Thulin | 425/115 |
| 4,714,014 A | * | 12/1987 | Hartl et al. | 99/450.2 |
| 4,719,117 A | * | 1/1988 | Simelunas | 426/502 |
| 4,832,970 A | * | 5/1989 | Mally et al. | 426/274 |
| 5,431,935 A | | 7/1995 | Carey | |
| 5,870,947 A | * | 2/1999 | Harada | 99/450.2 |
| 6,099,885 A | * | 8/2000 | Nelson et al. | 426/512 |
| 7,217,117 B2 | * | 5/2007 | Le Paih | 425/377 |

FOREIGN PATENT DOCUMENTS

| | | |
|---|---|---|
| JP | 62032861 A | 2/1987 |
| JP | 6292539 A | 10/1994 |
| JP | 8107773 A | 4/1996 |
| JP | 10174574 A | 6/1998 |

OTHER PUBLICATIONS

International Search Report for PCT/FR03/01578; ISA/EPO; Mailed Oct. 24, 2003.

* cited by examiner

*Primary Examiner*—James Mackey
(74) *Attorney, Agent, or Firm*—Harness, Dickey & Pierce, PLC

(57) ABSTRACT

The invention relates to forming stuffed mincemeat by producing a continuous lower layer of mincemeat, placing a filling on the lower layer, producing a continuous upper layer of mincemeat covering the lower layer and the filling, then cutting the stuffed mincemeat into portions and shaping the portions by compressing them on each side, in order to form the contour thereof, and also vertically in order to provide them with the desired thickness.

12 Claims, 7 Drawing Sheets

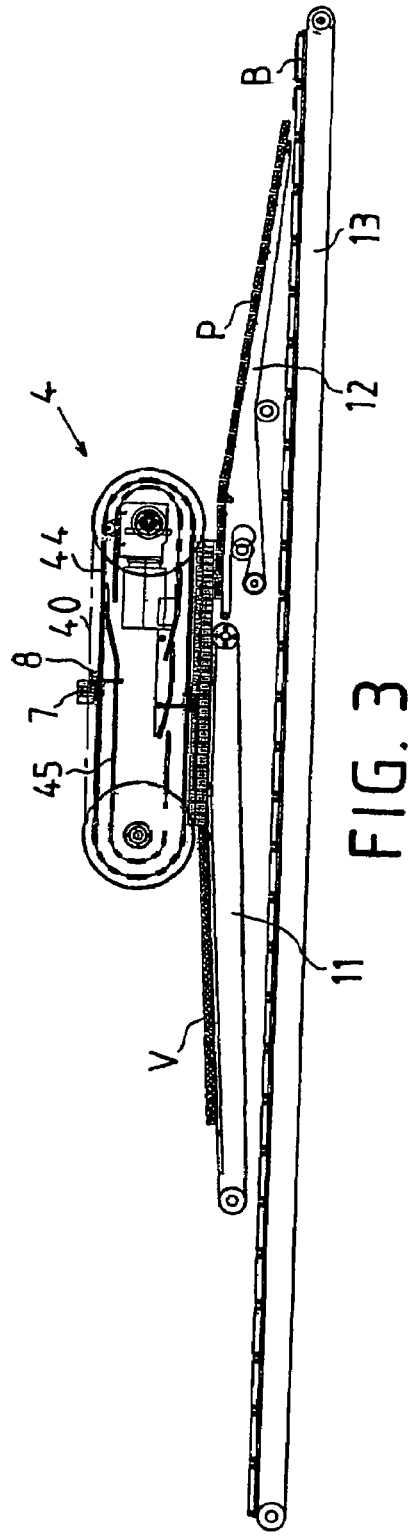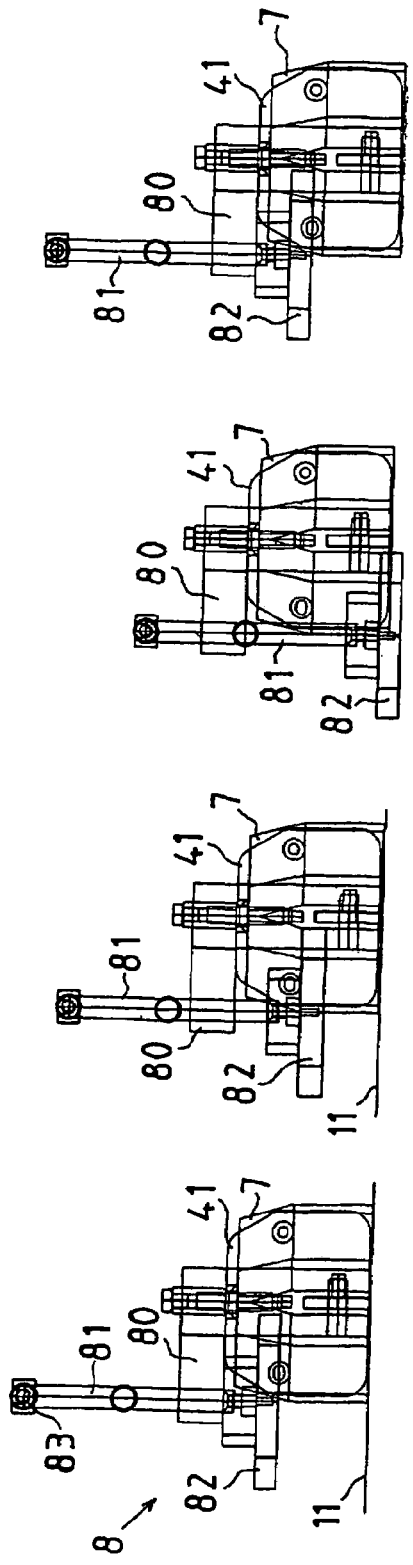

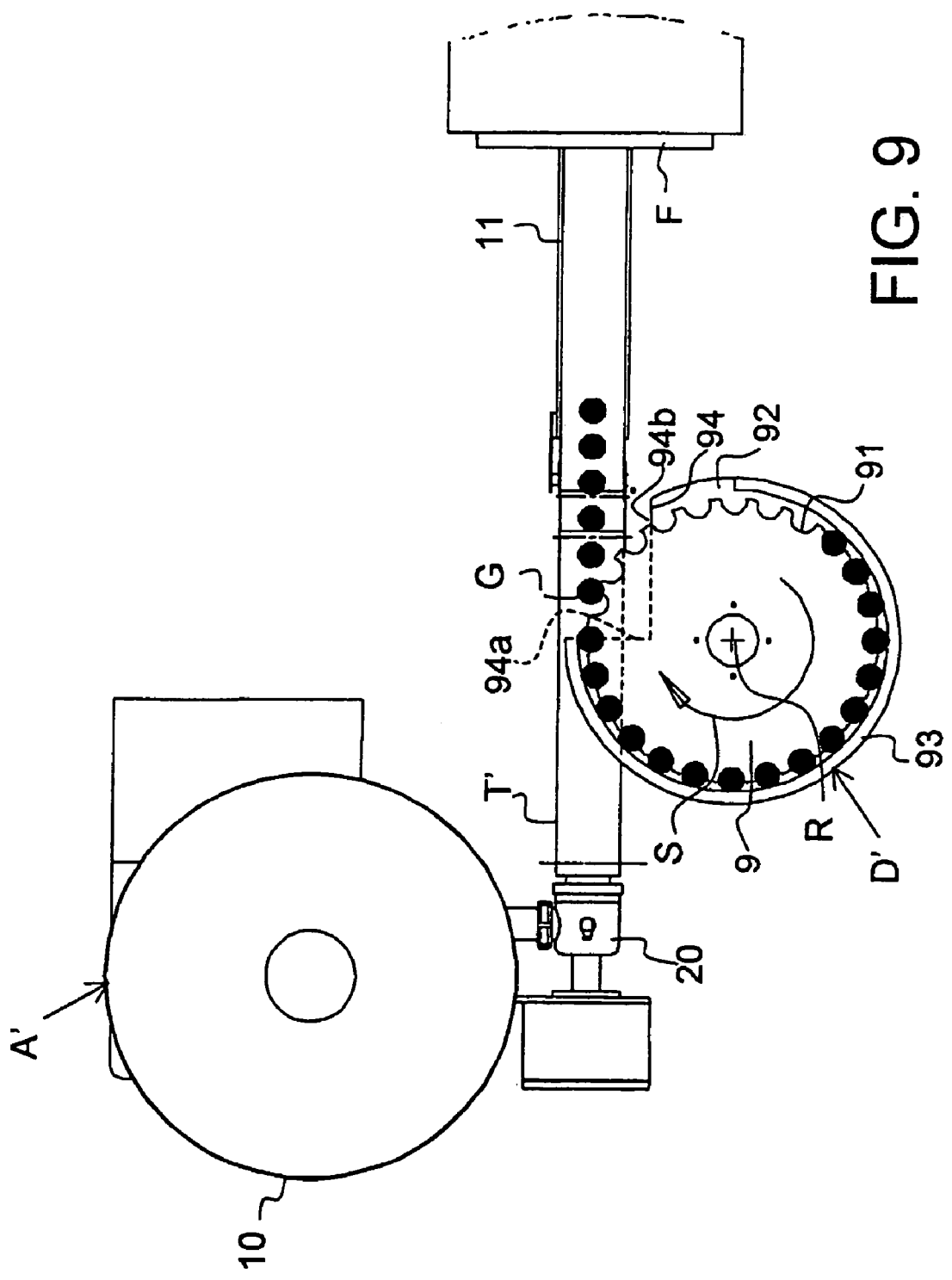

DEVICES FOR THE PRODUCTION OF MINCED MEAT STEAKS PROVIDED WITH A GARNISH

The present invention relates to the production of minced meat patties, especially minced meat steaks, provided with an internal garnish.

There are shaping machines to make minced meat steaks. These machines are based on the principle of a sliding tray with cavities, that is moved between a station for injecting the cavities with minced meat and a station for discharging the shaped steaks, as described for example in the French patent applications No. 98 12901 and No. 00 0539 filed on behalf of the present applicant. The latter application describes a known injection procedure for stuffing the minced meat steaks by means of tube-shaped needles.

This system is perfectly suitable for the injection of sauces. However, it is strictly limited to this use. And, by its very principle, it is not possible to conceive of its application to the introduction of garnishes that are not completely or sufficiently liquid. Now, in future developments of products of this kind, it must be expected that the garnishes will greatly evolve in their diversity as regards texture as well as content or shape.

There is also a method, known from the patent No FR 2 577 389 filed on behalf of Virassimy Joseph, for making stuffed minced meat patties in which the different production steps are performed at successive stations placed along an arrangement of two synchronous conveyor belts together defining cavities. From upstream to downstream, these stations are: a station for loading the bottom of the cavities with minced meat, a station for pressing down the bottom layer in the cavities, a garnish-dispensing station, a station for loading on an upper layer of minced meat, a compacting station and a discharging station. As in the system mentioned here above, the production is thus done step by step, necessitating a stopping time for the cavities at each station. In an industrial-scale production process, this method excessively restricts production rates.

Furthermore, in either of these two systems, the pressures brought into play for shaping and compacting are necessarily high, and the forces exerted haphazardly on the meat are highly detrimental to its internal structure. This results in compact patties that have a more or less grainy structure and are dry because they have released a large quantity of exudates.

These products are therefore of mediocre quality as compared with traditionally prepared minced meat steaks, where the meat that emerges from the screen of the mincing machine in threads, known as "angel's hair", has undergone only simple compacting without any destruction of the threads, so that it retains a relatively light and soft structure as well as maximum flavor.

The invention has been made in order to optimize the manufacturing of stuffed minced meat steaks in many aspects including simplicity of implementation and reliability, flexibility, quality and the possibility of production rates that match industrial-scale production.

To this end, the invention lies especially in a method for the production of minced meat patties, especially minced meat steaks, stuffed with a garnish, characterized in that it consists in forming a continuous loaf of stuffed minced meat by making a continuous lower layer of minced meat; placing the garnish on said lower layer; producing a continuous upper layer of minced meat in covering said lower layer and the garnish placed on this lower layer then cutting said loaf of stuffed minced meat into portions; and shaping said portions by compressing them on each side of said loaf of stuffed minced meat to shape the contour of said portions, and vertically in order to provide said portions with the desired thickness.

Since the loaf of stuffed minced meat is calibrated so as to be only slightly wider and thicker than the final product, the stresses needed for the shaping are minimal and, furthermore, if in the loaf the meat is textured in the form of longitudinally oriented threads, in other words in the form of "angel's hair", these threads will undergo these stresses only perpendicularly. The result of this is that the shaping essentially has only a moderate compacting effect rather than a crushing effect. This moderate compacting effect does not break the thread structure of the meat, and therefore resembles the traditional shaping method to the closest possible extent so as to have all its advantages. Furthermore, tests have shown and validated the fact that there is no need to resort to excessive vertical pressing to obtain an appropriate junction between the lower and upper layers of minced meat around the garnish.

The invention also relates to a device for implementing said method defined here above, characterized in that the method comprises:

a continuously running main conveyor belt;

and above this belt, for the formation therein of said loaf of stuffed minced meat, means to form said lower layer of minced meat, means to place said garnish on said lower layer of minced meat, and means to shape said upper layer of minced meat overlapping said lower layer of minced meat and said garnish;

as well as means to cut said loaf of stuffed minced meat into portions and means for shaping said portions, that work in synchronism with said conveyor belt.

In one advantageous embodiment of the invention, said means to form one or both of the lower and upper layers of minced meat comprise at least one dispenser spout fed by a flow-rate regulation unit called a "stuffer" with which a mincing machine is preferably associated.

Advantageously, the means for placing the garnish are capable of laterally depositing the garnish on the lower layer of minced meat.

According to one embodiment, the device comprises a main conveyor belt on top of which the following are positioned upstream to downstream: said means to form the lower layer of minced meat, said means to place the garnishes, and said means to form the upper layer of minced meat.

According to another embodiment, the means to form the lower and upper layers of minced meat are positioned upstream relative to the means for placing the garnish and comprise a stuffer feeding both an upper dispenser spout to form the lower minced meat layer on the main conveyor belt and a second dispenser spout to form the upper minced meat layer on a secondary conveyor belt, running continuously, placed above the main conveyor belt and capable of conveying and placing said upper layer of minced meat on said lower layer of minced meat and said garnish. The device then comprises means to place the garnish laterally, positioned between the main conveyor belt and the secondary conveyor belt.

The means for placing the garnish may comprise a dosing device if it is a liquid garnish, or a slicing machine if it is a garnish classically packaged in strand form. The means for the lateral placing of the garnish in the form of slices may include a notched wheel for the conveyance of the slices, said wheel being mounted rotationally above a plate about a shaft positioned substantially perpendicularly to the main conveyor belt. During the rotation of the notched wheel, the peripheral part of the wheel provided with notches runs directly above the main conveyor belt to lay the slices of garnish, previously positioned in the notches of the wheel, by gravity on the lower layer of minced meat. Naturally, the invention enables the association of several garnish-laying means in line without any difficulty.

The set of means used to cut said loaf of stuffed minced meat into portions and means for shaping said portions may be a cutting and shaping device of a type described in the French patent application No. 00 11259 filed on behalf of the present applicant. Such a device comprises the following to receive said loaf of stuffed minced meat: a shaping conveyor belt and, along it, means to cut said loaf of stuffed minced meat into portions, lateral shaping means acting simultaneously on each side of said loaf of stuffed minced meat to shape the contour of said portions, and vertical shaping means co-operating with said lateral shaping means to give said portions the desired thickness.

The characteristics and advantages of the invention mentioned here above, as well as others, shall appear more clearly in the following description and the appended drawings, of which:

FIG. 3 is a diagrammatic side view of a cutting and shaping device that can be used in the production line of FIG. 2;

FIGS. 7a to 7d are diagrammatic views illustrating the different movements of pressing elements in the device of FIGS. 3 to 6;

FIG. 9 is a partial top view of the production line of FIG. 8.

Figure 1:
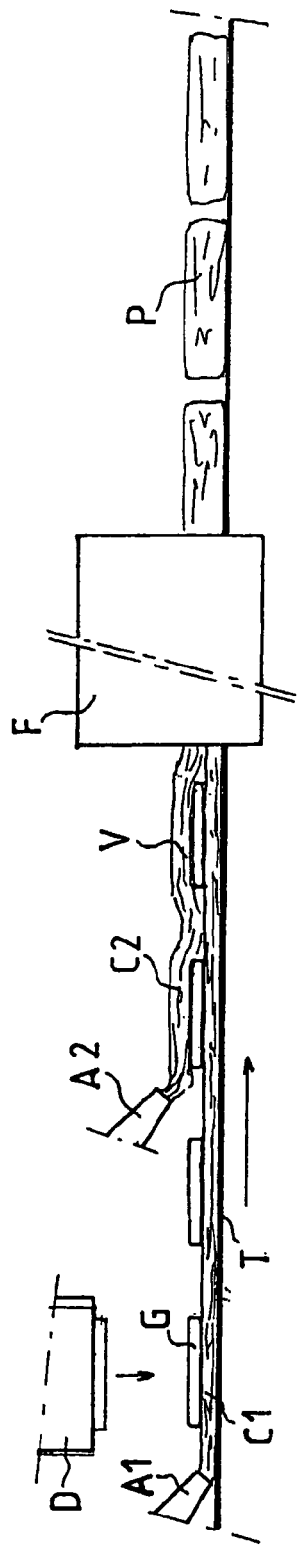
FIG. 1 is a diagrammatic side view illustrating the method according to the invention.

Considering first of all FIG. 1, it illustrates the method of manufacture of stuffed minced meat steaks according to the invention. This method consists here in the formation, on a continuously running conveyor belt T, of a continuous loaf of stuffed minced meat V.

To do this, a first upstream means A1 regularly delivers the minced meat on a determined width of the conveyor belt T, to shape a lower layer of minced meat C1.

A garnish dispenser D follows the upstream means A1 and places garnish at regular intervals on the lower layer of minced meat C1, in the form of relatively liquid topping portions, or else in the form of slices G as shown. Furthermore, it is clear from the drawing that the garnish can also be laid down without any complication by several serially arranged dispensers, thus providing the possibility of making composite garnishes, or else of alternating garnishes on the same production line.

Downstream from the laying down of the garnish, a continuous upper layer of minced meat C2 is formed by a second means A2 similar to the upstream means A1, so as to cover the lower layer C1 and the slices of garnish G.

Thus, the continuous loaf of stuffed minced meat V is formed. This loaf V then passes into a cutting and shaping device F that works in synchronism with the conveyor belt T, firstly to process the loaf V as it is formed and secondly to make portioning cuts substantially in the middle of the intervals between the successive slices of garnish.

The finished products P emerge on line from the device F, ready to be packed in their packaging.

Figure 2:
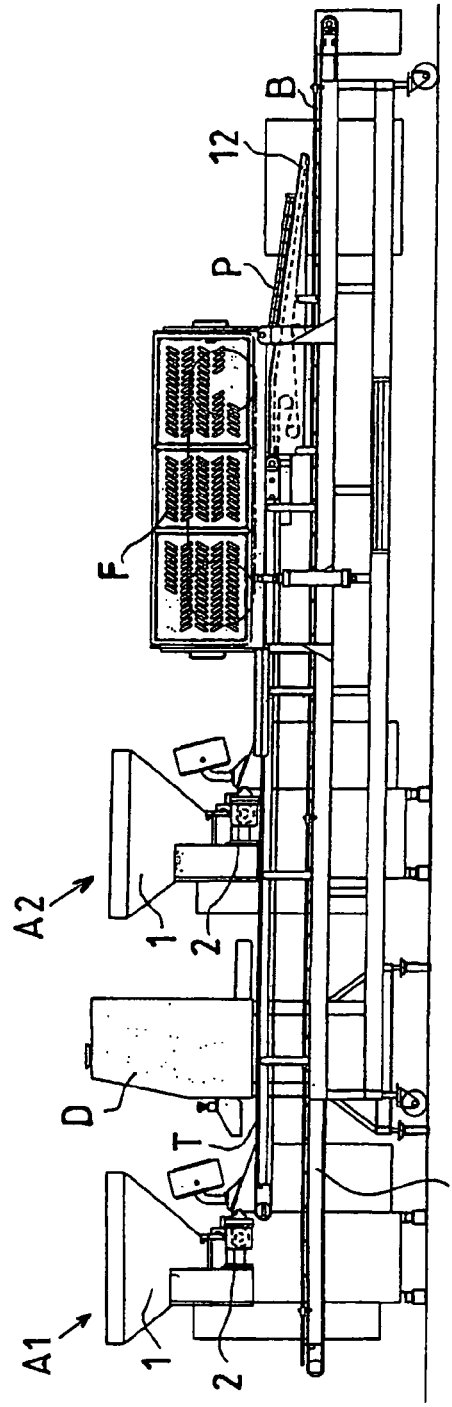
FIG. 2 is a view similar to that of FIG. 1 providing a highly diagrammatic illustration of a production line implementing the method of the invention.
Figure 4:
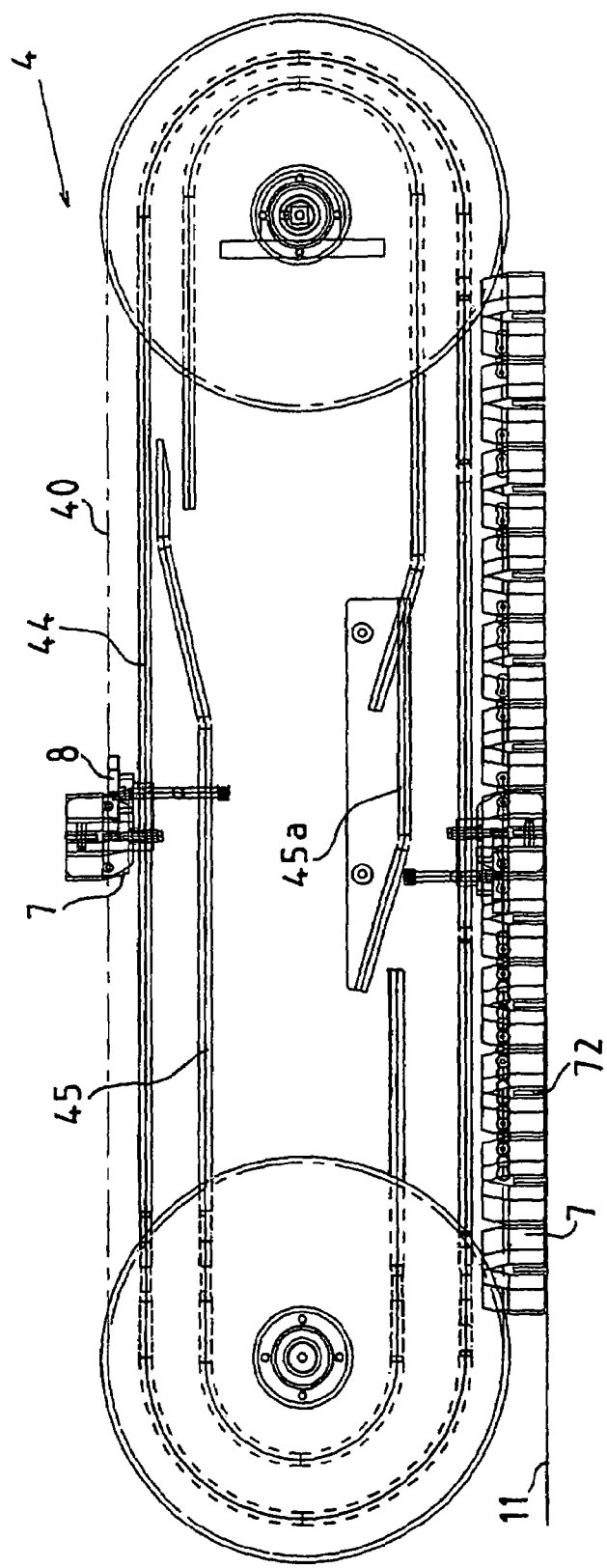
FIG. 4 is a diagrammatic side view representing an essential part of the device of FIG. 3 on a magnified scale.

FIG. 2 exemplifies the preferred embodiment of the production line for implementing the method illustrated in FIG. 1.

On either side of the garnish dispenser D, which is a classic slicing machine, the means A1 and A2 used respectively to form the lower layer C1 and upper layer C2 of minced meat each comprise a meat storage hopper 1. This hopper is provided at exit with an assembly 2 consisting of an element known as a stuffer in sausage-manufacturing that provides for a regular outflow rate and, associated with this stuffer, a grinder with an outlet screen delivers meat in the form of threads. This meat thus gets laid down by passing into a flattened, brush-shaped dispenser spout.

The cutting and shaping device F is of a type described in the patent application No. 00 11259 in the name of the present applicant. It is advantageously a preferred embodiment that shall be described in detail here below and is shown in FIGS. 3 to 7.

The finished products P coming out of the device F are taken up by a conveyor 12 which transfers them at outlet into packaging trays B conveyed by a lower conveyor 13.

As shown in FIGS. 3 to 7, the cutting and shaping device F includes a conveyor belt 11 hereinafter called a shaping conveyor belt, designed to make the loaf of stuffed minced meat V move forward as and when it is formed. In practice, the belt 11 is advantageously the same as the conveyor belt T on which the loaf V is formed.

The shaping means associated with the belt 11 include notched lateral shaping blocks 7 that run symmetrically in sliding on each side and immediately above this side. The blocks 7 are made of a material such as high-density polyethylene (HDPE) mounted adjacently after each other in a same endless loop arrangement 4 mounted on top of the shaping conveyor belt 11.

Figure 5:
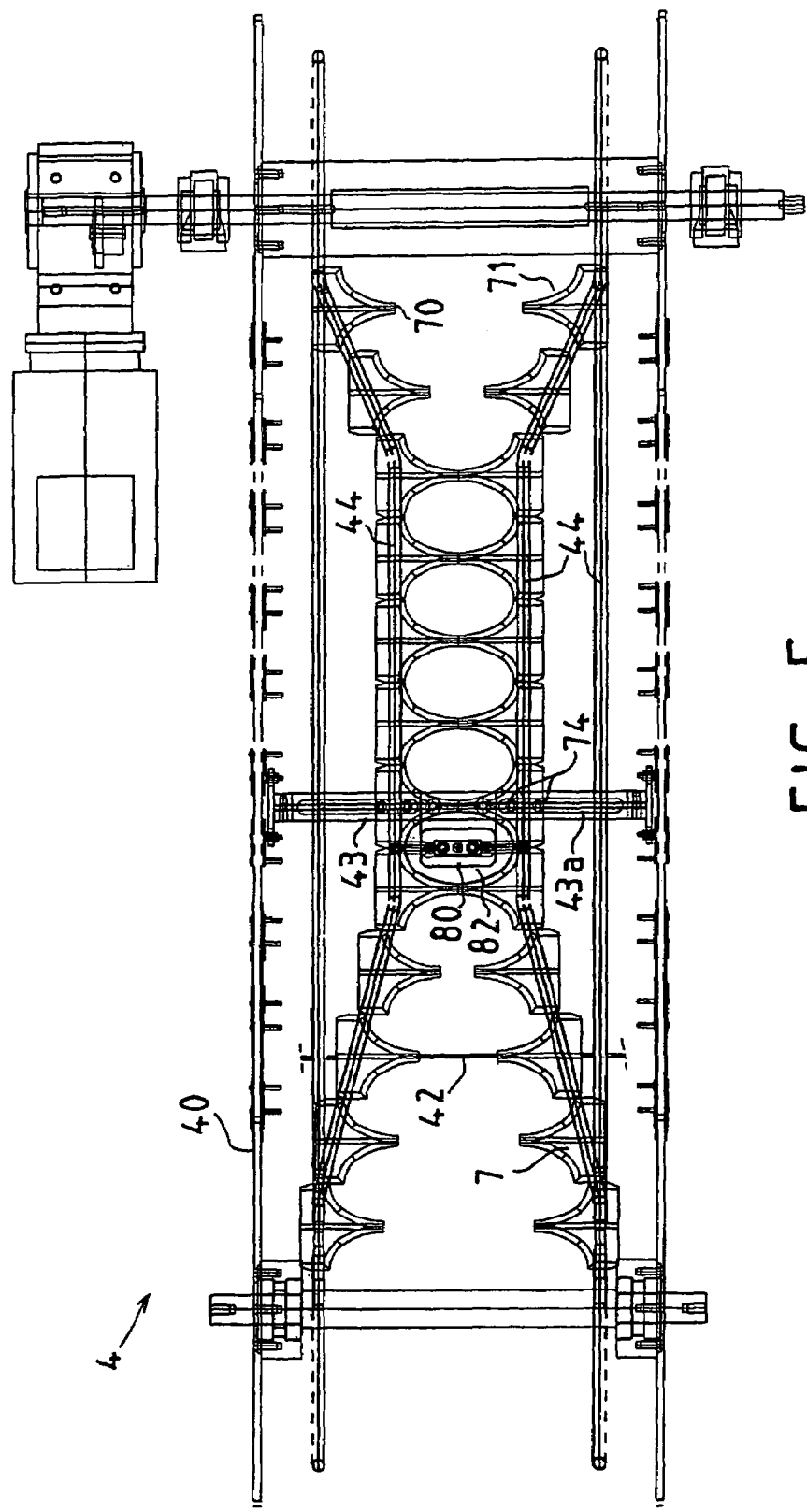
FIG. 5 is a partial diagrammatic top view of the part of the device shown in the FIG. 4.

From upstream to downstream on the shaping conveyor belt 11, the blocks 7 gradually approach each other face to face, until they touch each other so as to form shaping cavities with the belt and by their notches as illustrated in FIG. 5. Then they move apart again.

Pressing elements 8 co-operate with the lateral shaping blocks 7. These pressing elements 8 close said cavities from above when these cavities get formed. Then the pressing elements descend in two stages into these cavities, firstly to perform the desired compacting of the portions P, and then to transfer them positively to a lower level on the conveyor belt 12 following the shaping conveyor belt 11, and load them into the packaging trays B.

The cutting of the loaf V into portions P is done at the same time and by the same means as the shaping.

Figure 6:
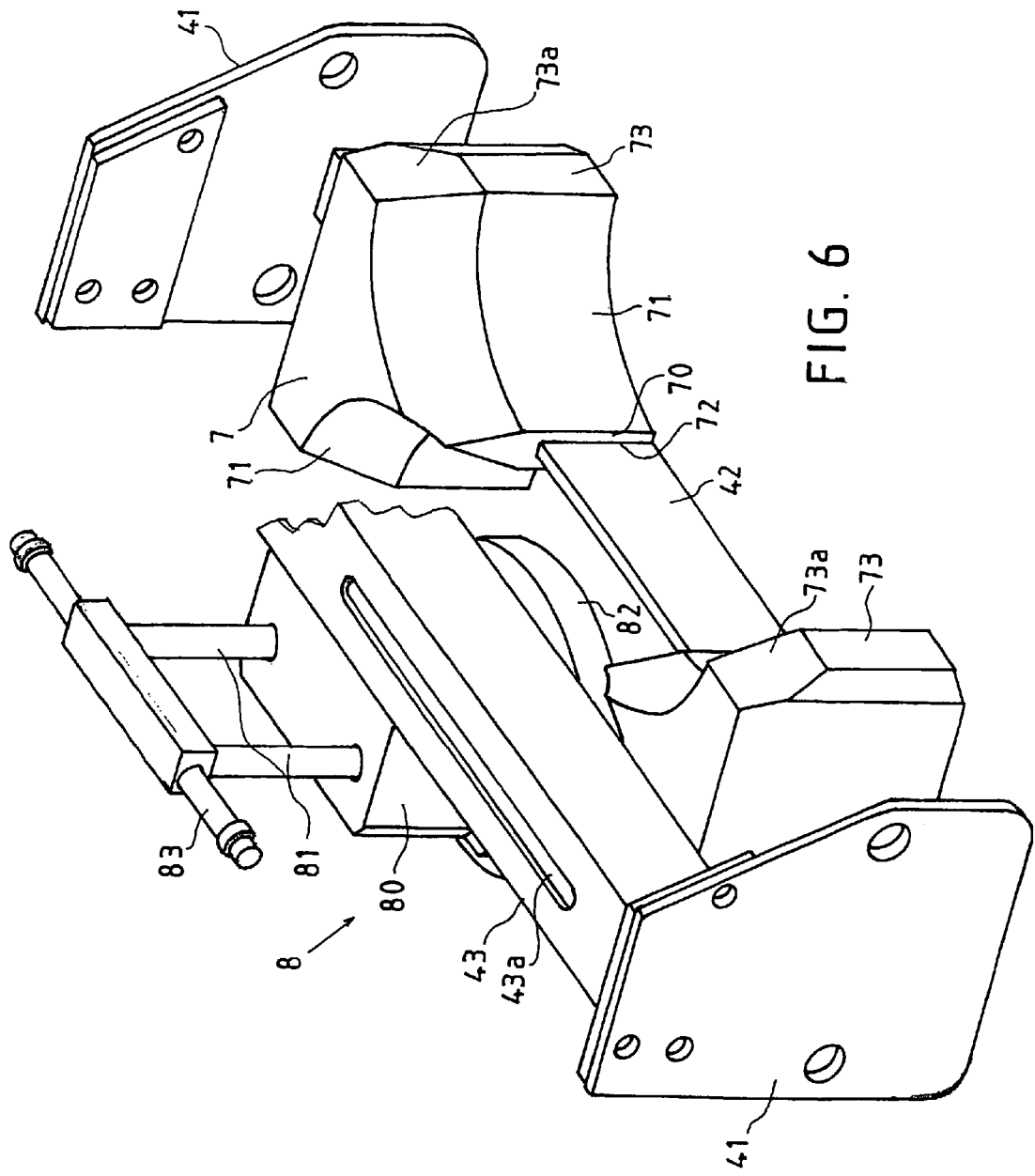
FIG. 6 is a diagrammatic view in perspective, on a magnified scale, showing the part of FIGS. 4 and 5 in greater detail.

The arrangement 4 includes two identical chains 40 positioned in parallel. Endplates 41 are fixed to the links of these chains adjacently and following one another as shown in FIG. 6. Every set of two endplates 41 bears a transversal runner 42 and, above it, a supporting cross-beam 43. Preferably, and as shown in FIG. 6, the runners 42 are flat bars positioned along their width perpendicularly to the chains 40, and may be inserted and blocked in open attachment slits opposite the beam 43 to allow speedy mounting/dismantling.

In this embodiment, the lateral shaping blocks 7 have the particular feature of being mounted so as to slide in a straddling position, facing each other in sets of two, on a runner 42, through a slit 72 in their lower wall, and that of being symmetrical relative to the plane of this wall. They have a median tip 70 directed inwardly, and bordered on each side by two indents 71, so that a shaping cavity will be formed not by two but by four shaping blocks, i.e. by two successive pairs of blocks 7 facing each other. Each block 7 and its immediate neighbors on the same side are joined to form the cavities by vertical front and rear faces 73, extending their indents 71 outwardly, the faces 73 inclining upward at 73a from a certain height onwards to enable the passage around end return devices. The transversal movements of the blocks 7 are commanded by guide-rails 44 that are gripped by pairs of fingers 74 of the blocks 7 crossing a passageway slit 43a made in the beams 43, FIG. 5. The blocks 7 are held in position on their respective runner 42 by the beam 43. Their base coincides with the lower edge of the runners 42, so that the runners arrive on a level with the shaping conveyor belt 11 and proceed to cut the loaf of stuffed minced meat V into portions.

Apart from ensuring that the blocks 7 are held in a straddling position on their runner 42, the beams 43 are used to support pressing elements 8 which have their base structures 80 bracket-mounted on the front or rear of these beams. The pressing elements 8 have thrust plates 82 at the end of rods 81 sliding in the base structures 80, and the distal ends of these plates bear rollers (not shown) by means of a transversal shaft 83. These wheels co-operate with a guideway 45 to control the movements. It must be noted that in FIGS. 3 and 4, the section 45a of the guideway corresponding to the shaping section is shown as being adjustable, to enable the modification as required of the pressing run of the pressing elements 8.

In operation, when the blocks 7 come into contact with the shaping conveyor belt 11, together with their runner 42, the belt cuts the stuffed minced meat loaf V. The cutting will be completed by the blocks 7 facing each other when their tips 70 meet each other. Synchronism is planned between the garnish dispenser D and the running of the runners 42, so that the loaf V is cut well within the interval between two portions of garnish.

After the shaping, the pressing elements 8 carry out a positive transfer of the portions P on to the belt 12 whose inlet is below the outlet of the shaping belt 11. The various functional positions of the pressing elements 8 are represented diagrammatically in FIGS. 7a to 7c: the raised position is shown in FIG. 7a, the "end of pressing" position in FIG. 7b, "end of discharge of portions" position in FIG. 7c, and the return to raised position in FIG. 7d.

Figure 8:
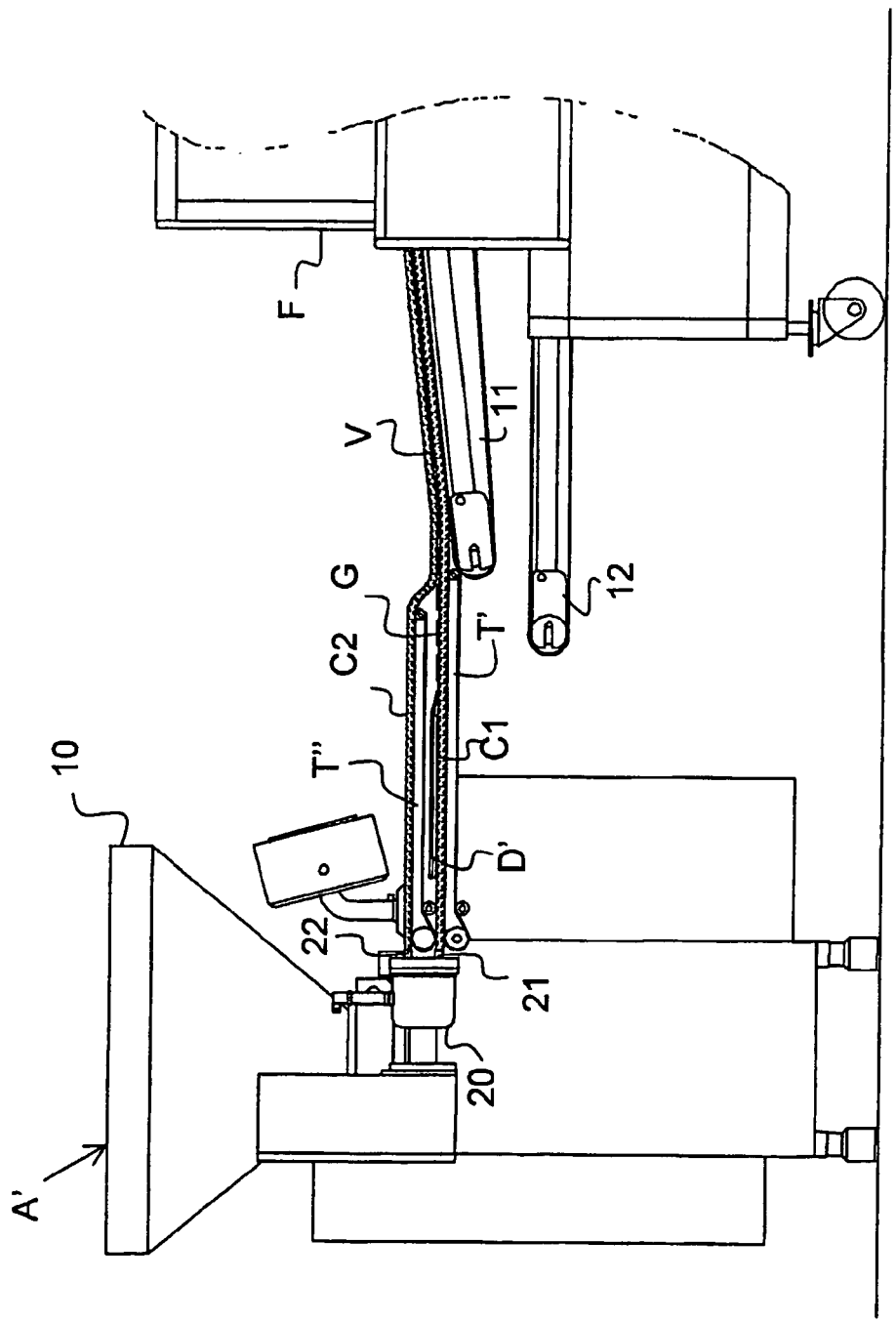
FIG. 8 is a partial side view providing a highly diagrammatic illustration of a production line according to one alternative embodiment of the invention.

FIGS. 8 and 9 show an alternative embodiment of a production line according to the invention. In this alternative embodiment, the lower layer C1 and upper layer C2 of minced meat are made by means A1 positioned upstream relative to a main conveyor belt T'. These means A1 comprise a single assembly 20 provided with two dispenser spouts 21, 22 vertically offset with respect to each other. This assembly 20 has a structure similar to that of the assemblies 2 described here above in relation to FIG. 2. The assembly 20 is fed by means of a single meat storage hopper 10 and includes a stuffer, a mincing machine and at least one outlet screen interposed between said mincing machine and the two dispenser spouts 21, 22. A first dispenser spout 21 regularly places minced meat on a main conveyor belt T' to form the lower layer of minced meat C1, while the second spout 22, positioned above the first spout, regularly places minced meat on a secondary belt T" positioned above the main conveyor belt T', parallel to this belt. As shown in FIG. 8, the assembly 20 is positioned upstream relative to the main conveyor belt T' and secondary conveyor belt T", with the dispenser spout substantially parallel to the conveyor belts T' and T".

A dispenser of garnish D' is positioned downstream relative to the assembly 20, between the main conveyor belt T' and secondary conveyor belt T", and places the garnish in the form of slices G, at regular intervals, on the lower layer of minced meat C1. Referring to FIG. 9, the dispenser D' includes a notched conveyor wheel 9 mounted rotationally about a shaft R driven by a motor (not visible) and above a circular plate 92. The circular plate 92 has a peripheral shoulder 93 extending over substantially 270° and positioned at a distance from the notches 91 of the wheel. Furthermore, on its shoulder-less region, the circular plate has a broadly triangular peripheral cut-out portion 94 defined by a first radial edge 94a extending radially inwards from one of the ends of the shoulder 93, substantially on half of the radius of the plate, and extending by a second edge 94b that is orthogonal to it.

The shaft R is positioned substantially perpendicularly to the directions of feed of the two conveyor belts. The dispenser D' is positioned so that, during the rotation of the wheel, the notches 91 of the wheel run between the main conveyor belt T' and the secondary conveyor belt T", above the main conveyor belt T', the cut-out portion 94 of the circular plate being positioned at the level of said conveyor belt T', with its first edge 94a substantially perpendicular to the conveyor belts.

As shown in FIG. 9, in which the secondary conveyor belt T" is not shown for the sake of clarity, each notch 91 of the wheel is designed to receive a slice of garnish G. The notches have a semicircular shape to receive circular slices of garnish. It is of course possible to provide for differently shaped notches, depending on the shape of the slices of garnish to be dispensed. The notched wheel is supplied with slices of garnish G at the region without shoulder 93 of the circular plate 92, called a feeder zone. It is supplied for example by a conveyor belt above which a classic slicing machine is positioned. During the clockwise rotation of the wheel, as illustrated by the arrow referenced S, the slices of garnish G are conveyed from the feeder zone up to the first radial edge 94a of the cut-out section 94. During this movement, the slices of garnish rest on the circular plate and are held in the notches 91 by the shoulder 93. Beyond the radial edge 94a, the slices of garnish fall by gravity on to the lower layer of meat C1.

The secondary conveyor belt T' has a length smaller than that of the main conveyor belt T", and the upper layer of meat C2 is laid down at the exit from this secondary conveyor belt T" on the lower layer of meat C1 and the slices of garnish G that have just been laid down, to form the loaf of stuffed minced meat V. Naturally, the rotation speed of the wheel 9 and the speeds of motion of the two conveyor belts T' and T" are synchronized. As described here above, the loaf of stuffed minced meat V is transferred as and when it is formed on to the conveyor belt 11 of the cutting and shaping device F.

The use of the single assembly with two dispenser spouts to form the two layers of minced meat C1 and C2, in combination with the garnish dispenser to bring the garnish laterally between the two conveyor belts T' and T", gives a shorter and more compact production line. The lateral garnish dispenser could be adapted to the texture of the garnish used.

The invention claimed is:

1. A device for the production of minced meat comprising:
a continuously running main conveyor belt;
means to form and deposit a lower layer of minced meat;
means to place a garnish on said lower layer of minced meat;
means to form an upper layer of minced meat overlaping said lower layer of minced meat and said garnish to form a loaf of stuffed minced meat;
means to cut said loaf of stuffed minced meat into portions; and
means for shaping said portions that work in synchronism with said conveyor belt;

wherein said means used to cut said loaf of stuffed minced meat into portions and means for shaping said portions comprise a cutting and shaping device including;

a shaping conveyor belt and, along it, means to cut said loaf of stuffed minced meat into portions;

lateral shaping means acting simultaneously on each side of said loaf of stuffed minced meat to shape the contour of said portions;

and vertical shaping means cooperating with said lateral shaping means to give said portions the desired thickness.

2. The device according to claim 1, wherein said lateral shaping means are indented blocks running symmetrically on each side and immediately above said shaping conveyor belt which, from upstream to downstream, approach each other until they touch each other to form shaping cavities by their indents and with said shaping conveyor belt, said vertical shaping means being pressing elements that come over said shaping conveyor belt, between said lateral shaping devices, and run synchronously with them.

3. The device according to claim 2, wherein each of said lateral shaping blocks has two indents on each side of a central tip in such a way that the shaping cavities are formed between two consecutive pairs of facing lateral shaping blocks, said blocks being mounted so as to be sliding two by two, facing each other on a transversal runner.

4. The device according to claim 3, wherein said lateral shaping blocks comprise, in their lower wall, a slit through which they are mounted in a sliding position on their respective runner, this runner being a flat bar proceeding to cut said loaf of minced meat into portions.

5. The device according to claim 4, wherein said pressing elements are borne as brackets by beams, each of which is mounted on top of a runner and fixed with it between two lateral endplates which are themselves fixed to the links of two parallel chains of an endless loop arrangement.

6. The device according to claim 2, wherein the pressing elements constituting the vertical shaping means have a supplementary run to positively discharge the portions after the shaping.

7. A device for the production of a stuffed minced meat loaf having a lower layer, a garnish disposed on the lower layer, and an upper layer disposed on said garnish comprising:

means to cut said loaf of stuffed minced meat into portions; and means for shaping said portions;

wherein said means used to cut said loaf of stuffed minced meat into portions and means for shaping said portions comprise a cutting and shaping device including;

a shaping conveyor belt and, along it, means to cut said loaf of stuffed minced meat into portions;

lateral shaping means acting simultaneously on each side of said loaf of stuffed minced meat to shape the contour of said portions;

and vertical shaping means cooperating with said lateral shaping means to give said portions the desired thickness.

8. The device according to claim 7, wherein said lateral shaping means are indented blocks running symmetrically on each side and immediately above said shaping conveyor belt which, from upstream to downstream, approach each other until they touch each other to form shaping cavities by their indents and with said shaping conveyor belt, said vertical shaping means being pressing elements that come over said shaping conveyor belt, between said lateral shaping devices, and run synchronously with them.

9. The device according to claim 8, wherein each of said lateral shaping blocks has two indents on each side of a central tip in such a way that the shaping cavities are formed between two consecutive pairs of facing lateral shaping blocks, said blocks being mounted so as to be sliding two by two, facing each other on a transversal runner.

10. The device according to claim 9, wherein said lateral shaping blocks comprise, in their lower wall, a slit through which they are mounted in a sliding position on their respective runner, this runner being a flat bar proceeding to cut said loaf of minced meat into portions.

11. The device according to claim 10, wherein said pressing elements are borne as brackets by beams, each of which is mounted on top of a runner and fixed with it between two lateral endplates which are themselves fixed to the links of two parallel chains of an endless loop arrangement.

12. The device according to claim 8, wherein the pressing elements constituting the vertical shaping means have a supplementary run to positively discharge the portions after the shaping.

* * * * *